United States Patent
Silva et al.

(10) Patent No.: US 7,872,984 B2
(45) Date of Patent: Jan. 18, 2011

(54) DISCOVERING PARAMETERS FOR A COMMUNICATIONS LINK

(75) Inventors: Stephen J. Silva, Fort Collins, CO (US); John A. Morrison, Fort Collins, CO (US); Chritopher Wilson, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 136 days.

(21) Appl. No.: 12/251,702

(22) Filed: Oct. 15, 2008

(65) Prior Publication Data

US 2010/0091666 A1   Apr. 15, 2010

(51) Int. Cl.
   *H04L 12/26*   (2006.01)
(52) U.S. Cl. .................. 370/252; 370/241; 709/228
(58) Field of Classification Search .................. 370/241, 370/248, 249, 250, 252; 709/220, 221, 222, 709/223, 224, 225, 227, 228, 229
See application file for complete search history.

(56) References Cited

U.S. PATENT DOCUMENTS

| | | | |
|---|---|---|---|
| 6,970,652 B2 * | 11/2005 | Zhang et al. | 398/162 |
| 7,168,027 B2 * | 1/2007 | Lee et al. | 714/775 |
| 7,215,144 B2 | 5/2007 | Mitby et al. | |
| 7,498,106 B2 * | 3/2009 | Mui et al. | 430/30 |
| 7,613,126 B1 * | 11/2009 | Natarajan et al. | 370/252 |

OTHER PUBLICATIONS

J. Zhang et al., "White Paper on Transmit Pre-Emphasis and Receive Equalization," 8 pages (Oct. 31, 2002).
J. Chen et al., "High Speed Signaling Design: from 1 Gbps to 10 Gbps," presented at DesignCon East 2004, 17 pages (2004).

* cited by examiner

*Primary Examiner*—Chi H Pham
*Assistant Examiner*—Weibin Huang

(57) ABSTRACT

To dynamically adjust at least one setting of an interface to a communications link in a system, in response to receiving an indication of a change in a characteristic of the communications link, a representation of potential solutions for parameters associated with the communications link is constructed. From the representation, at least one solution is selected from among the potential solutions, where the selected at least one solution specifies values for the parameters that define the at least one setting for the interface to the communications link.

18 Claims, 3 Drawing Sheets

DISCOVERING PARAMETERS FOR A COMMUNICATIONS LINK

BACKGROUND

Modern electronic devices, such as computer systems, storage systems, communications systems, and so forth, employ relatively high-speed communications links. A communications link (e.g., a bus, a network link, etc.) can be made up of different combinations of communications media, such as conductive traces on a circuit board, cables, connectors, and so forth. There may be many different possible combinations of different media for implementing communications links.

A driver interface that transmits and receives signals over a communications link is typically associated with tunable parameters that are set according to the combination of communications media in the communications link. A communications link that includes different media can experience reflections due to changes in the media type. Moreover, different media types can exhibit different propagation losses. The tunable parameters of a driver interface are set to values to optimize (or to ensure proper operation of) the communication of signals over the communications link that includes some combination of different media.

For each combination of different media that make up a communications link, a unique set of parameter values for the driver interface is determined, usually by running a number of tests in a laboratory. Once the parameter values are determined, such parameter values can be stored within a system in which the communications link is present. The stored parameter values are used to provide the settings for the corresponding driver interface during system operation.

It is possible that portions of a communications link may be changed during the life of the system, such as for maintenance or repair purposes. For example, if one cable is replaced with another cable, it is possible that the characteristics of the new cable may differ from those of the original cable. This may cause the predefined parameter values for the corresponding driver interface to no longer be valid, which can adversely affect reliability and performance of communications links in the system.

BRIEF DESCRIPTION OF THE DRAWINGS

Some embodiments of the invention are described with respect to the following figures.

DETAILED DESCRIPTION

In accordance with some embodiments, a technique or mechanism is provided to dynamically adjust one or more settings of an interface to a communications link in a system. Over the life of the system, characteristics of the communications link can change, such as due to replacement or repair of portions of the communications link (e.g., a cable, connector, or circuit board being replaced or repaired). Also, aging, environmental conditions, or other factors may affect the characteristics of the communications link. In response to indications of a change to at least one characteristic of the communications link, an update of values of parameters associated with the communications link is dynamically determined. The updated parameter values can then be used to adjust settings for a communications link interface connected to the communications link whose characteristic(s) has (have) changed.

In some embodiments, to dynamically determine the updated values of parameters associated with the communications link, a representation of potential solutions for parameter values associated with the communications link is constructed. The representation can be in the form of a graph, for example, where the graph can be an N-dimensional graph having N dimensions corresponding to N respective parameters that are variable for the communications link. From the representation, such as the graph, at least one solution is selected from among the potential solutions, where the selected at least one solution specifies values for the parameters associated with the communications link.

Figure 1:
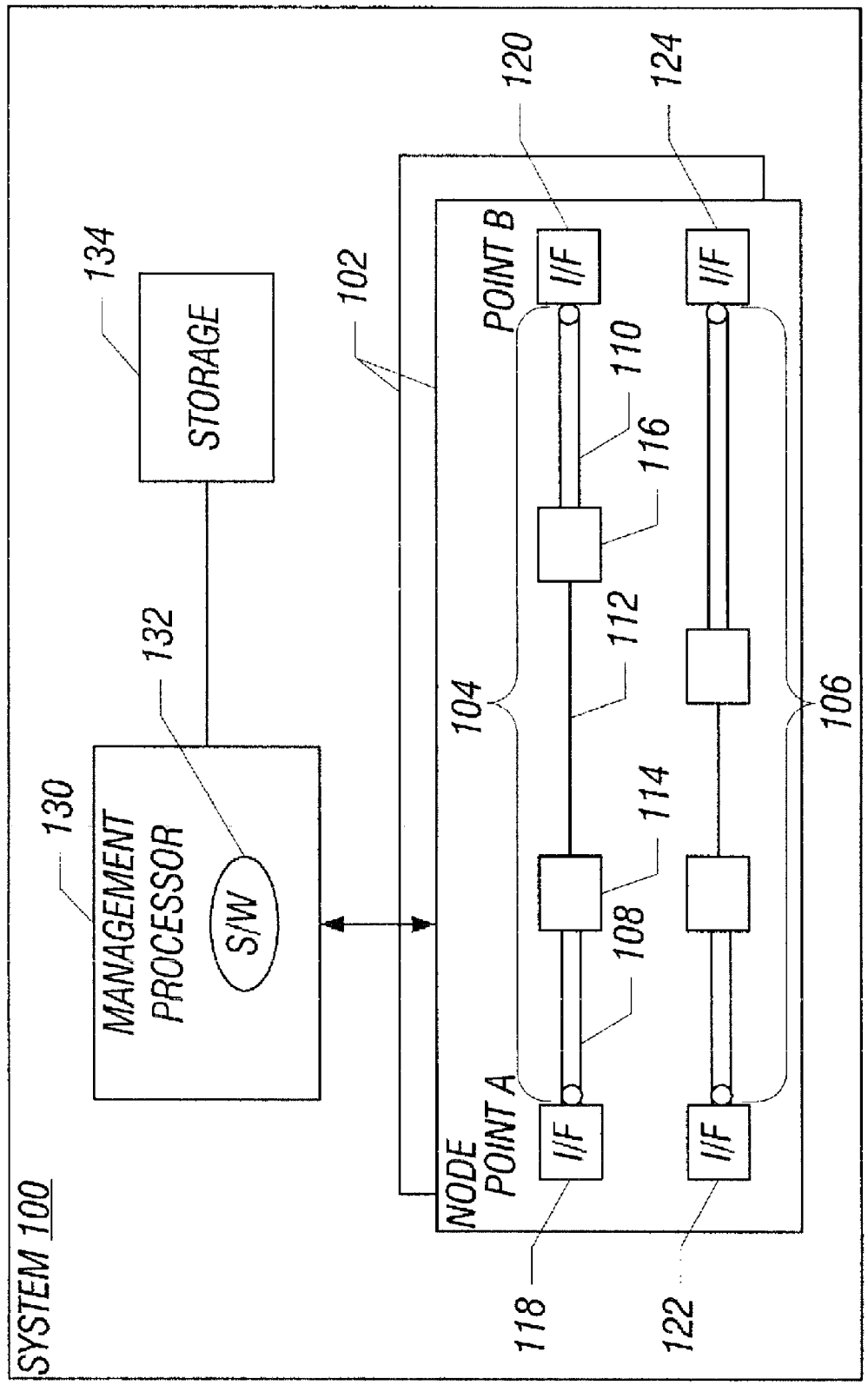
FIG. 1 is a block diagram of an exemplary system that includes communications links and interfaces to the communications links whose settings can be dynamically adjusted, in accordance with an embodiment.

FIG. 1 illustrates an exemplary system 100 that includes one or more nodes 102. Examples of the system 100 include computer systems, storage systems, communications systems, and so forth. The nodes 102 of the system 100 can be processing nodes, storage nodes, or communications nodes. Although multiple nodes are depicted, it is contemplated that techniques according to some embodiments are applicable to single-node systems.

In the example of FIG. 1, a node 102 can include multiple communications links 104 and 106. Although just two communications links are depicted in FIG. 1, it is noted that a node typically can include many more communications links. Each of the communications links 104, 106 is associated with a communications link interface at point A (interface 118 or 122) and another communications link interface at point B (interface 120 or 124). Point-to-point signals are transmitted and received over the communications link 104 or 106 between the interfaces at the two points.

The communications links 104 and 106 can be high-speed communications links, such as SerDes (serializer/deserializer) communications links. An interface to a SerDes link can include a serial-to-parallel converter and a parallel-to-serial converter to convert signals between serial format and parallel format. In other implementations, the communications links 104 and 106 can be of other types.

The communications link 104 is made up of multiple portions between point A and point B. The multiple portions of the communications link 104 include, for example, cables 108 and 110, conductive traces 112 (e.g., conductive traces on a circuit board), and connectors 114 and 116 between the conductive traces 112 and corresponding ones of the cables 108 and 110. The cables 108, 110, the conductive traces 112, and the connectors 114, 116 constitute different types of communications media. Transitions between media of different types can cause reflections. Moreover, different media can be associated with different loss characteristics. To enable proper communication of signals across the communications link 104, particularly at high speeds, the interfaces 118 and 120 to the communications link 104 have settings that are assigned for correct performance (in some cases, optimal performance).

The communications link 106 similarly includes different portions (of different media type) connected between interfaces 122 and 124, and the settings of the interfaces 122 and 124 can similarly be assigned to ensure correct (or optimal) performance of signal communication over the link 106.

The settings of each communications link interface (118, 120, 122, 124) are determined based on parameters associated with the communications link. In one example, such parameters can be pre-emphasis parameters that define settings for the communications link interfaces. Some examples of pre-emphasis parameters include the following: electrical current drive strength (which defines the current drive strength of a signal driver in the communications link interface); pre-cursor, cursor, and post-cursor coefficients associated with signals; and other parameters. Depending on the different types of media that can be used for implementing each communications link, there can be multiple different combinations of values for the parameters.

Conventionally, the correct combination of parameter values used for defining settings of a communications link interface is manually determined based on a battery of tests performed in a laboratory. Such static and predefined values for the parameters are then supplied with a system containing the communications link. For example, the parameter values for multiple communications links can be stored in a database, which is accessed during operation of the system to provide settings for the communications link interfaces. However, if the determined values for the parameters are incorrect for any reason, such as due to changes in characteristics of a communications link, then the predefined parameter values may no longer be valid or optimal. As a result, another round of manual testing may have to be performed to adjust the parameter values. This is a time-consuming process, which can be expensive.

In accordance with some embodiments, dynamic adjustment of values of the parameters that define settings for communications link interfaces can be automatically performed by a system, such as by a management processor 130 depicted in FIG. 1. In the example of FIG. 1, the management processor 130 is part of the system 100, and performs general management tasks for the system 100. Instead of using the management processor 130 that is separate from the nodes 102, it is noted that one of the nodes 102 can perform the dynamic adjustment of parameter values in accordance with some embodiments, in a different implementation. As yet another example, the management processor 102 for performing dynamic adjustment of parameter values can be separate from the system 100.

The management processor 130 executes software code 132 for performing dynamic adjustment of parameter values in accordance with some embodiments. The software code 132 can be pre-loaded and stored on storage media that is part of the management processor 130. Alternatively, the software code 132 can be stored in a storage 134 that is separate from the management processor 130 but that is accessible by the management processor 130. As yet another alternative, the software code 132 can be downloaded from another location, such as over a network (e.g., Internet) or using a removable storage medium.

Figure 2:
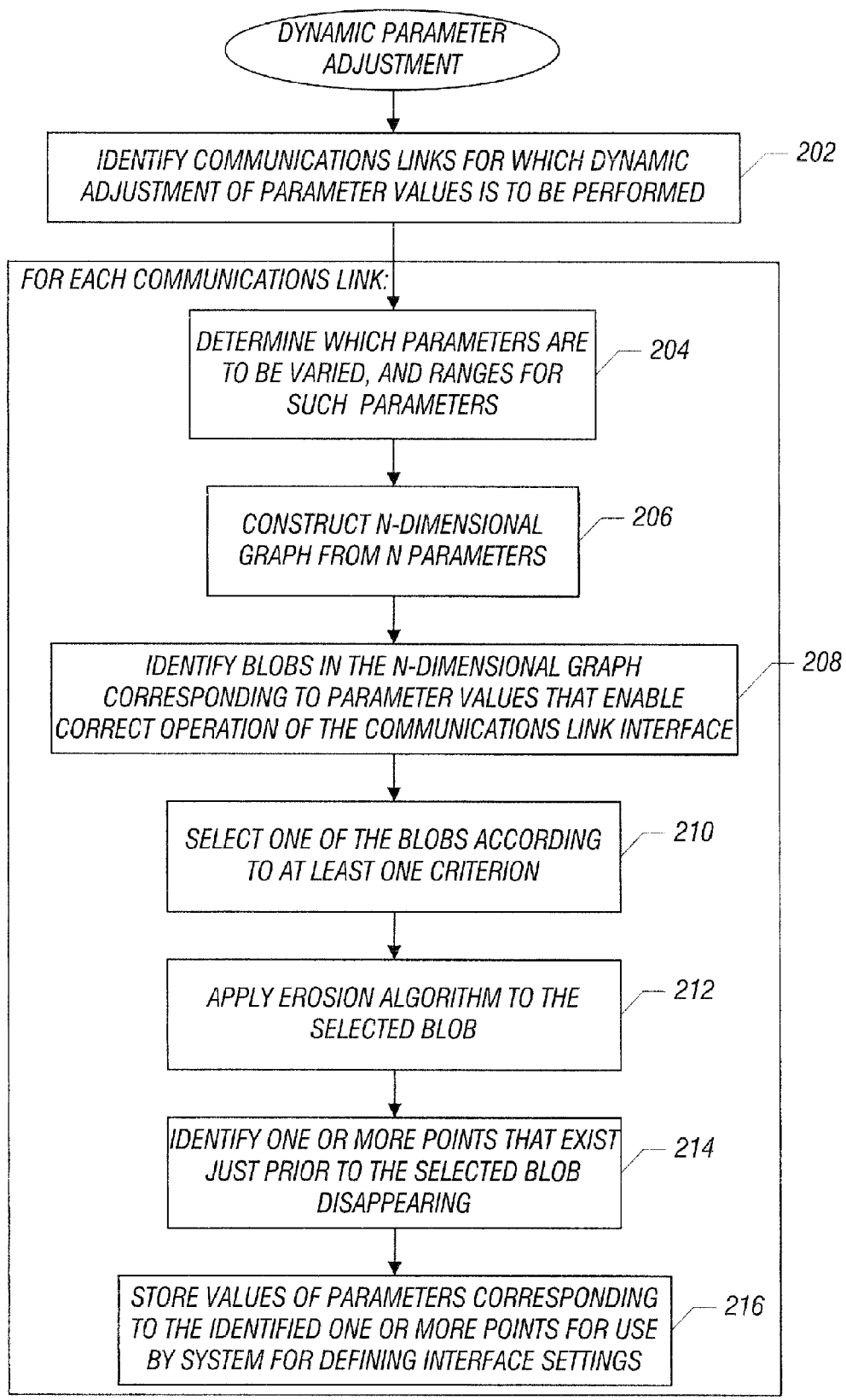
FIG. 2 is a flow diagram of a process of dynamically adjusting values of parameters that define settings for communications link interfaces, in accordance with an embodiment.

FIG. 2 shows a dynamic parameter adjustment procedure according to an embodiment. The procedure can be performed by the software code 132 executable by the management processor 130 (FIG. 1), for example.

Communications links within a system for which dynamic adjustment of parameter values is to be performed are identified (at 202). Such communications links can be identified based on pre-stored configuration data, which may have been input by a user or a system manufacturer.

Note that the dynamic parameter adjustment procedure depicted in FIG. 2 can be performed in response to an event, such as detecting that one or more characteristics of a communications link have changed. Detection of a change in characteristic(s) of a communications link can be based on detecting that a portion of the communications link has been replaced or repaired, based on detecting that the life of the system (or communications link) has crossed some threshold, or based on detecting that environmental conditions have exceeded certain thresholds (e.g., temperature in the system 100 exceeding a temperature threshold, etc.).

Figure 3:
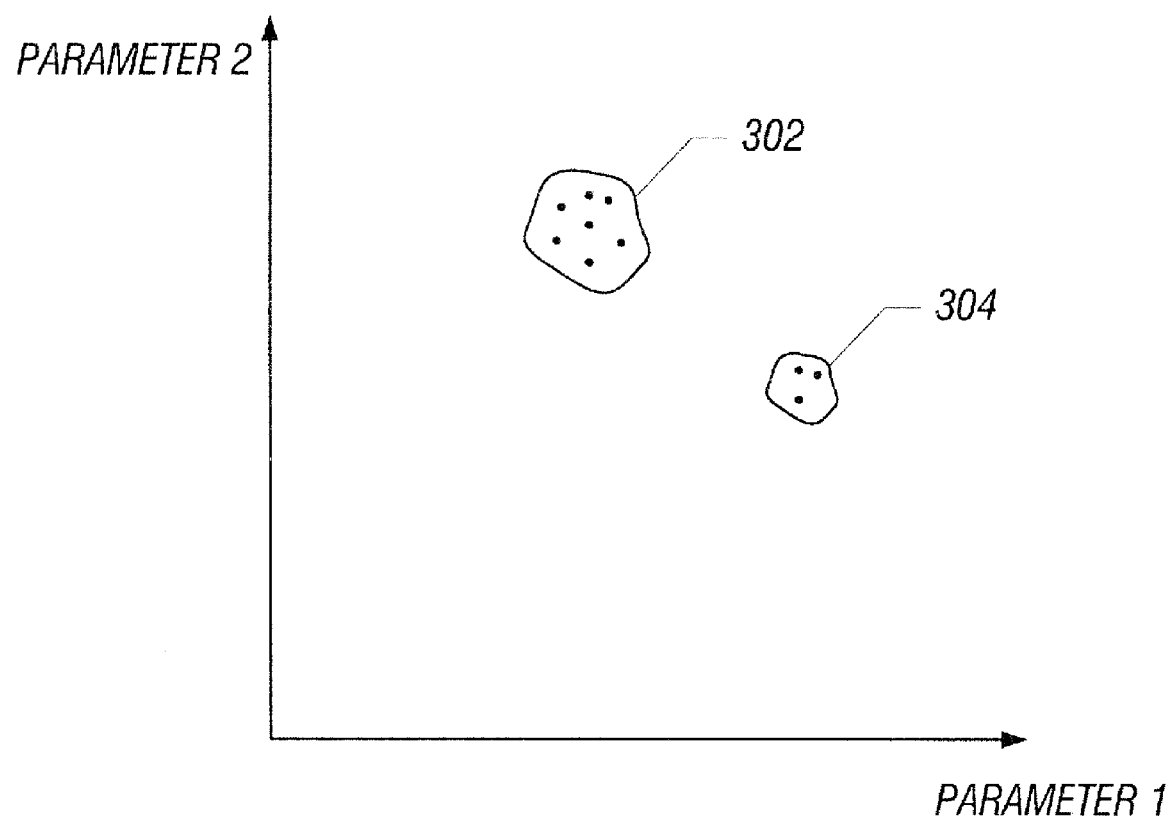
FIG. 3 is a graph of points associated with different values of two parameters for a communications interface, where the points indicate parameter values associated with proper operation of the communications interface, and where the graph is used by the process of dynamically adjusting values of communications link interface parameters according to an embodiment

For each identified communications link, the following tasks are performed. It is determined (at 204) which parameters are to be varied, and the ranges of values for such parameters. There can be N parameters that are to be varied, where $N \geq 2$. Based on the N parameters, an N-dimensional graph is constructed (at 206). Although reference is made to constructing a graph in some embodiments, it is noted that other representations (e.g., tables or other data structures) can be constructed based on the N parameters. A two-dimensional graph is shown in FIG. 3, where the two-dimensional graph of FIG. 3 is defined based on two parameters associated with settings for a communications link interface. In the graph of FIG. 3, a first axis (horizontal axis) corresponds to parameter 1, and a second axis (vertical axis) corresponds to parameter 2. Various points are depicted in the graph, where each point is defined by a value for parameter 1 and a value for parameter 2 that enables proper functioning of the communications link interface. In other words, if the settings of the communications link interface are set based on the values of parameter 1 and parameter 2 corresponding to a point in the graph of FIG. 3, then the communications link interface will be able to correctly communicate signals over the communications link. Each visible point on the graph thus represents a potential solution for parameter values that define functioning settings for the communications link interface.

As shown in FIG. 3, regions (also referred to as "blobs") 302 and 304 of points are present. A "blob" is a relatively concentrated collection of points in the graph (as compared to other more sparse collections of points). Although two blobs 302 and 304 are shown in FIG. 3, it is noted that just one blob can be present, or that more than two blobs may be present in the graph.

Referring again to FIG. 3, blobs of points in the N-dimensional graphs corresponding to parameter values that enable correct operation of the communications link interface are identified (at 208). One of the blobs is then selected (at 210) according to at least one criterion. Note that in a different implementation, more than one blob can be selected. The at least one criterion that can be used for selecting a blob (or multiple blobs) can be a size criterion. For example, the blob with the largest size (or M largest blobs, $M \geq 2$) can be selected. In other embodiments, other criteria can be used for selecting blobs. One such other criterion can be the aspect ratios of the blobs (where aspect ratio refers to the ratio of one dimension of the blob to another dimension).

Next, according to an embodiment, an erosion algorithm is applied (at 212) to the selected blob. The erosion algorithm progressively erodes the selected blob until just L point(s) ($L \geq 1$) remain(s). In one example, the blob is eroded by using the following algorithm: for any given point in the blob that is marked "good" (in other words, the point corresponds to parameter values that enable correct functioning of a communications link interface), if any of the neighboring points to the given point is marked "not good" (associated with parameter values that would cause incorrect functioning of the communications link interface), then the given point is marked "not good." The erosion algorithm iteratively progresses until just L point(s) remain(s).

Basically, the erosion algorithm is an image processing technique that erodes the blob by removing less desirable potential solutions (represented by the points of the N-dimensional graph) in an iterative process. The boundary of the blob is considered a meta-stable portion that indicates which parameters would be less desirable. The L remaining point(s) at the end of the erosion algorithm is (are) likely to be located close to the center of the blob.

As a result of the erosion algorithm, the L remaining point(s) is (are) identified (at 214). The L point(s) correspond(s) to the optimal one or more solutions for the values of the parameters. The values of the parameters corresponding to the identified one or more points are stored (at 216) for use by the system for defining communications link interface settings. For example, the values of the parameters can be stored in a database that is stored in a storage of the system 100 (FIG. 1). This database can be accessed by the management processor 130 during operation for defining settings for the one or more interfaces to communications links, based on the values of the parameters contained in the database.

Although reference is made to selecting optimal points in a blob using an erosion algorithm, other embodiments can employ other algorithms for selecting optimal solutions of parameter values. For example, genetic algorithms, objective function algorithms, and other algorithms can be used.

Further enhancements to the procedure discussed above may be possible. For example, it can be determined that changes in the environment condition of the system (e.g., temperature, etc.) can correspond to different optimal values of the parameters. In accordance with an alternative embodiment, an association can be defined between changes in the environmental conditions and changes in the values of the parameters. Such association can be defined by the database stored in the system 100.

The system 100 can then employ one or more sensors to detect changes in the environmental condition. For example, the system 100 can employ temperature sensors to detect temperatures in the system 100. In response to indications of changes in the environmental condition, the association can then be accessed to vary the values of the parameters for changing communications interface settings.

Another enhancement that may be implemented is to provide indications of changes to the shape of blobs as the system ages. Aging of the system can cause characteristics of one or more portions of the communications link to change. As a result, the points corresponding to acceptable parameter values in the N-dimensional graph can also change, which will affect the shapes of blobs. Thus, as the system ages, as determined by the management processor 130 (e.g., such as by monitoring how long the system has been in use), the management processor 130 can cause updates in characteristics of the communications link, which in turn would invoke the procedure of FIG. 2.

Yet another possible enhancement is the management processor 130 being able to vary the speed of the communications links to achieve more optimal solutions. For example, for a given speed of the communications link, the management processor 130 may detect that the blobs in the N-dimensional graph may be too small, or that blobs do not exist at all. As a result, an optimal solution may not be identifiable based on such relatively small blobs.

In accordance with some embodiments, if the management processor 130 determines that blobs in the N-dimensional graph are too small (e.g., the size of the largest blob is less than some predefined threshold), then the management processor 130 can cause the speed of the communications link to be reduced. A reduction in the speed of a communications link would result in a larger set of possible parameter values that can enable correct operations of communications link interfaces. This means that there would be more points in the N-dimensional graph that correspond to the correct solutions, and therefore, the blobs would be increased in size.

Alternatively, the management processor 130 may detect that there are too many large-sized blobs, which can be an indication that increased speed of the communications link is possible. In such a case, the management processor 130 can cause an increase in the speed of the communications link, which would in turn cause blobs in the N-dimensional graph to be reduced in size.

Instructions of software described above (including the software code 132 of FIG. 1) are loaded for execution on a processor (such as management processor 130 in FIG. 1). The processor includes microprocessors, microcontrollers, processor modules or subsystems (including one or more microprocessors or microcontrollers), or other control or computing devices. As used here, a "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for dynamically adjusting at least one setting of an interface to a communications link in a system, comprising:

receiving, by a processor, an indication of a change in at least one characteristic of the communications link;

in response to receiving the indication, constructing, by the processor, a graphical representation containing elements representing potential solutions for parameters associated with the communications link; and determining, by the processor, from the graphical representation at least one solution selected from among the potential solutions, wherein the selected at least one solution specifies values for the parameters that define the at least one setting for the interface to the communications link, wherein determining the selected at least one solution comprises applying image processing on the graphical representation to iteratively remove identified ones of the elements until a predetermined number of the elements remain, wherein the predetermined number is at least one.

2. The method of claim 1, wherein constructing the graphical representation comprises constructing a graph having points representing the potential solutions.

3. The method of claim 2, wherein the graph is an N-dimensional graph, where $N \geq 2$, and the method further comprising associating the N dimensions with N corresponding parameters that are variable for the communications link.

4. The method of claim 1, further comprising:
storing the values of the parameters in a data structure; and
accessing the data structure during operation of the system to define the at least one setting of the interface.

5. The method of claim 1, further comprising:
associating changes in the values of the parameters with changes in an environmental condition of the system; and
during operation of the system,
receiving an indication of a change of the environmental condition; and
in response to receiving the indication of the change and according to the associating, adjusting the values of the parameters.

6. The method of claim 1, further comprising:
detecting aging of the system;
modifying the graphical representation to account for the aging; and
repeating the determining task based on the modified graphical representation.

7. The method of claim 1, wherein the parameters comprise pre-emphasis parameters.

8. A method for dynamically adjusting at least one setting of an interface to a communications link in a system, comprising:
receiving, by a processor, an indication of a change in at least one characteristic of the communications link;
in response to receiving the indication, constructing, by the processor, a graph having points representing potential solutions for parameters associated with the communications link, wherein the graph is an N-dimensional graph, where $N \geq 2$;
associating, by the processor, the N dimensions with N corresponding parameters that are variable for the communications link;
determining, by the processor, from the graph at least one solution selected from among the potential solutions, wherein the selected at least one solution specifies values for the parameters that define the at least one setting for the interface to the communications link;
identifying blobs of points on the graph; and
selecting one of the blobs based on at least one criterion, wherein the selected blob contains points representing a subset of the potential solutions.

9. The method of claim 8, wherein selecting the blob based on the at least one criterion comprises selecting a largest one of the blobs.

10. The method of claim 8, further comprising:
applying an algorithm to erode the selected blob until just L points remain, where $L \geq 1$, wherein the L point(s) correspond to the selected at least one solution.

11. The method of claim 10, wherein a boundary of the selected blob is associated with undesirable values of the parameters.

12. The method of claim 8, further comprising:
detecting that the blobs are of undesirable sizes;
in response to detecting that the blobs are of undesirable sizes, reduce a speed of the communications link; and
repeating the constructing, determining, identifying, and selecting tasks for the reduced speed.

13. A system comprising:
a node having a communications link and an interface to the communications link; and
a processor to:
detect a change in at least one characteristic of the communications link;
in response to detecting the change, construct a graph having points representing potential solutions of parameters associated with the communications link, wherein the graph is an N-dimensional graph, where $N \geq 2$;
associate the N dimensions with N corresponding parameters that are variable for the communications link;
identify blobs of points on the graph;
select one of the blobs based on at least one criterion, wherein the selected blob contains points representing a subset of the potential solutions;
select, in the selected blob one of the potential solutions that specifies values of the parameters; and
dynamically adjust at least one setting of the interface in response to the values of parameters specified by the selected one potential solution.

14. The system of claim 13, wherein the parameters comprises pre-emphasis parameters.

15. The system of claim 13, wherein selection of the blob based on the at least one criterion comprises selecting a largest one of the blobs.

16. The system of claim 13, wherein the processor is to further:
erode the selected blob until just L points remain, wherein $L \geq 1$, wherein the L point(s) correspond to the selected at least one solution.

17. An article comprising at least one non-transitory computer-readable storage medium containing instructions that when executed cause a processor to:
detect a change in at least one characteristic of the communications link;
in response to detecting the change, construct a graphical representation containing elements representing potential solutions for parameters associated with the communications link; and
select, from the graphical representation, at least one solution from among the potential solutions, wherein the selected at least one solution specifies values for the parameters that define at least one setting for an interface to the communications link, wherein selecting the at least one solution comprises applying image processing on the graphical representation to iteratively remove identified ones of the elements until a predetermined number of the elements remain, wherein the predetermined number is at least one.

18. The article of claim 17, wherein the graphical representation containing elements comprises a graph containing points representing the potential solutions, and wherein the instructions when executed cause the processor to further:
identify blobs of points on the graph; and
select one of the blobs based on at least one criterion, wherein the selected blob contains points representing a subset of the potential solutions.

* * * * *